UNITED STATES PATENT OFFICE.

EUGENE P. SCHOCH, OF AUSTIN, TEXAS.

PROCESS OF PRODUCING BARIUM CHLORATE.

1,391,858.      Specification of Letters Patent.     Patented Sept. 27, 1921.

No Drawing.     Application filed September 13, 1920. Serial No. 409,794.

*To all whom it may concern:*

Be it known that I, EUGENE P. SCHOCH, a citizen of the United States, residing at Austin, in the county of Travis and State of Texas, have invented certain new and useful Improvements in Processes of Producing Barium Chlorate; and I do hereby declare the following to be a full, clear, and exact description of the invention, such as will enable others skilled in the art to which it appertains to make and use the same.

This invention relates to a process of making substantially pure barium chlorate and has for its object to provide a procedure which will be more expeditious and less costly to carry out than those heretofore proposed.

With these and other objects in view the invention consists in the novel steps and combinations of steps constituting the process all as will be more fully hereinafter disclosed and particularly pointed out in the claims.

In order that the precise invention may be the more clearly understood it is said: It is well known that chlorin will react with barium carbonate suspended in hot water, or with a hot, dilute solution of barium hydroxid so as to form a mixture of barium chlorate and barium chlorid in substantially the molecular ratio of 1 to 5. It is, however, taught in the well known text book of chemistry by Alexander Smith and it is commonly believed from other sources to be a fact that, the resulting mixture of barium chlorate and chlorid cannot be readily or economically separated because the two salts are held to have very nearly the same solubilities.

I have on the other hand, discovered that these two salts can be easily and economically separated from their solutions and each obtained in a substantially pure state by a process of crystallization.

In carrying out the invention I may dissolve a mixture of barium chlorate and chlorid in any quantity of hot water sufficient for that purpose, and evaporate the same by boiling until the solution is saturated with the chlorate. Should the ratio of chlorate to chlorid be substantially less than one to one by weight or for instance, near the molecular ratio of 1 to 5, as it will be when made with chlorin and a barium compound as above indicated, then before the point of saturation for barium chlorate is reached, barium chlorid will separate out of the hot solution and the crystals thus formed will be found to be substantially pure.

But as the remaining hot liquor becomes relatively richer in chlorate the crystals of chlorid formed will include small amounts of the said chlorate, although this impurity will never be found to exceed say 4% at the maximum.

Starting with a mixture of chlorate and chlorid in said molecular ratio of say, about 1 to 5, I have found in practice that one may thus readily obtain from the hot solution two thirds of the chlorid crystals formed in a substantial state of purity. Accordingly, as the crystallization proceeds I remove these said pure crystals, and I may use them over again in making a new batch of the original mixture. The contaminated crystals of chlorid above mentioned may also be added to said new batch and worked over again with it.

The chlorid crystals formed from the hot solution having been thus removed, the solution is allowed to cool, whereupon a mixture of chlorate and chlorid crystals containing substantially 70% chlorate to 30% of chlorid is obtained. These crystals will contain two thirds or more of the chlorate originally present in the solution. These last named mixed crystals are removed from the cool solution, drained and washed as usual, and then dissolved in the least amount of hot water necessary for the purpose. The second solution thus obtained is evaporated by boiling to a slight extent for the purpose of reaching the saturation point of the first salt crystallizing out which will be barium chlorate. This said second solution is next allowed to cool, whereupon substantially pure barium chlorate crystals will be found to separate out and may be removed.

The amount of pure barium chlorate crystals thus obtained pure and removed from the solution will be about one half of the original chlorate present in the solution.

The remaining liquors from both the first and the second solutions above mentioned now contain chlorate and chlorid in a ratio by weight which is much less than one to one, and they may be again subjected to the above mentioned first crystallizing process, either by themselves, or together with the above mentioned new batch of the original mixture. It will thus be seen that when the ratio of chlorate to chlorid is less than one to one by weight this invention involves at most two distinct operations.

Substantially pure chlorid crystals are separated out in the first operation; and in the second operation substantially pure barium chlorate crystals are separated out. On the other hand, if the ratio of chlorate to chlorid is between one to one and 70 to 30 by weight, then the mixture need be merely dissolved in the least amount of hot water required, when it may be allowed to cool, whereupon a mixture of crystals containing chlorate and chlorid in the ratio of 70 to 30 or slightly above are obtained, and these crystals may then be subjected to the second operation described above to obtain substantially pure barium chlorate.

Finally, if the ratio of chlorate to chlorid is 70 to 30 or above, then the procedure of separating out barium chlorate is the same as the second crystallizing operation just mentioned. In other words, it will now be clear that I may take a mixture of barium chlorate and chlorid in any proportions at all, and separate out substantially pure barium chlorate by not more than two crystallizing operations in any case, and by a single operation if the ratio of chlorate to chlorid exceeds 70 to 30. I may also separate out pure barium chlorid in a single operation when the above mentioned ratio is substantially less than one to one.

In actual operation it is possible to reduce these purifying processes to one single recrystallizing operation by allowing the formation of chlorate and chlorid to continue in the original solution until the hot solution is saturated with the chlorate. During this operation the excess of chlorid formed beyond that which the solution can hold will naturally drop out in the crystalline form; while the chlorate will accumulate. The resulting solution when allowed to cool will immediately deposit crystals containing 70% chlorate and 30% of chlorid and these need be subjected only to the above mentioned second additional crystallizing operation.

It will now be clear that if the ratio by weight of barium chlorate to barium chlorid in the solution is less than one to one, a concentration of the hot solution will precipitate out substantially pure barium chlorid. On the other hand, if this said ratio is approximately one to one or greater, there will be precipitated on cooling the solution a mixture of crystals containing barium chlorate and barium chlorid in the ratio of seven to three or greater. And again, if the ratio of barium chlorate to barium chlorid in the solution is approximately seven to three or greater, then upon cooling said solution there will be precipitated substantially pure barium chlorate.

By following the foregoing procedure and deriving the mixed chlorate and chlorid from barium carbonate or hydrate and chlorin I am enabled to produce substantially pure barium chlorate at a cost competing with sodium chlorate, and can then proceed to make commercially pure barium perchlorate and commercially pure ammonium perchlorate for use in explosives at costs far less than is possible by known methods. Especially is this true when it is remembered that the residues left after the formation of the pure substances are returned to the process and worked over again, thus avoiding all loss of material.

It is obvious that those skilled in the art may vary the details of the procedure without departing from the spirit of the invention, and therefore, I do not wish to be limited to the above disclosure except as may be required by the claims.

What I claim is:—

1. The process of obtaining barium chlorate from barium chlorid in solution which consists in first crystallizing out a substantial portion of said chlorid and then crystallizing out a substantial portion of said chlorate, substantially as described.

2. The process of obtaining barium chlorate in a substantially pure state when admixed with barium chlorid which consists in making a hot solution of said salts; evaporating the said solution until a portion of the said chlorid separates out; removing said portion; cooling the residue to precipitate the barium chlorate; and recovering said chlorate in a substantially pure condition, substantially as described.

3. The process of separating barium chlorate in a substantially pure state when admixed with barium chlorid which consists in making a hot solution of said salts; evaporating the said solution until a portion of the said chlorid separates out; removing said portion; cooling the residue to precipitate the barium chlorate; making a second hot solution of said chlorate, and evaporating said second solution to crystallize out substantially pure barium chlorate, substantially as described.

4. The continuous process of making barium chlorate which consists in treating a hot solution of barium hydroxid with chlorin to form a mixture of barium chlorate and barium chlorid in solution; continuing the addition of the reacting ingredients until said solution is saturated with barium chlorate; cooling said solution to precipitate mixed crystals of said chlorate and chlorid; and recovering in a substantially pure form said barium chlorate, substantially as described.

In testimony whereof I affix my signature.

EUGENE P. SCHOCH.